(12) United States Patent
Ash et al.

(10) Patent No.: US 6,895,678 B2
(45) Date of Patent: May 24, 2005

(54) BOREHOLE NAVIGATION SYSTEM

(75) Inventors: Michael E. Ash, Lexington, MA (US); Richard T. Martorana, Andover, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 109 days.

(21) Appl. No.: 10/632,717

(22) Filed: Aug. 1, 2003

(65) Prior Publication Data
US 2005/0022404 A1 Feb. 3, 2005

Related U.S. Application Data
(60) Provisional application No. 60/442,879, filed on Jan. 27, 2003, and provisional application No. 60/400,465, filed on Aug. 1, 2002.

(51) Int. Cl.[7] ............... G01C 19/00; G01C 9/00
(52) U.S. Cl. ............... 33/313; 33/321; 33/366.13
(58) Field of Search ............... 33/304, 313, 318, 33/321, 322, 323, 328, 366.11, 366.12, 366.13, 542, 544

(56) References Cited

U.S. PATENT DOCUMENTS

| | | |
|---|---|---|
| 3,079,696 A | 3/1963 | van Rooyen |
| 3,883,788 A | 5/1975 | Storey, Jr. |
| 4,052,654 A | 10/1977 | Kramer et al. |
| 4,071,959 A | 2/1978 | Russell et al. |
| 4,454,756 A | 6/1984 | Sharp et al. |
| 4,537,067 A | 8/1985 | Sharp et al. |
| 4,594,790 A | 6/1986 | Engebretson |
| 4,696,112 A | 9/1987 | Hoffman |
| 4,756,088 A | 7/1988 | Russell et al. |
| 4,987,684 A | 1/1991 | Andreas et al. |
| 5,126,812 A | 6/1992 | Greiff |
| 5,156,056 A | 10/1992 | Pittman et al. |
| 5,349,855 A | 9/1994 | Bernstein et al. |
| 5,396,326 A | 3/1995 | Knobbe et al. |
| 5,432,699 A | 7/1995 | Hache et al. |
| 5,657,547 A | 8/1997 | Uttecht et al. |
| 5,806,195 A | 9/1998 | Uttecht et al. |
| 6,216,804 B1 | 4/2001 | Aumann et al. |
| 6,267,185 B1 | 7/2001 | Mougel et al. |
| 6,347,282 B2 | 2/2002 | Estes et al. |
| 6,548,321 B1 | 4/2003 | Sawyer |
| 6,778,908 B2 | 8/2004 | Ash et al. |

FOREIGN PATENT DOCUMENTS

WO    WO 03/031912 A2    4/2003

OTHER PUBLICATIONS

US 6,151,553, 11/2000, Estes et al. (withdrawn)

*Primary Examiner*—Christopher W. Fulton
(74) *Attorney, Agent, or Firm*—Iandiorio & Teska

(57) ABSTRACT

An omnidirectional borehole navigation system is provided which features a housing for traversing a borehole; a gimbal system including at least one outer gimbal connected to the housing and at least one inner gimbal nested in and connected to the outer gimbal; a solid state three-axis gyro assembly mounted on the inner gimbal; a solid state three-axis accelerometer assembly mounted on the inner gimbal; gyro logic circuits on the inner gimbal responsive to the three-axis gyro assembly to produce the inertial angular rate about each gyro input axis; accelerometer logic circuits on the inner gimbal to produce the non-gravitational acceleration along each accelerometer input axis; and a microprocessor responsive to the gyro logic circuits and the accelerometer logic circuits for determining the attitude and the position and velocity of the housing in its borehole.

45 Claims, 10 Drawing Sheets

Accel Board Assembly

Gyro Board Assembly

INERTIAL NAVIGATION WHILE DRILLING OR LOGGING

BOREHOLE NAVIGATION SYSTEM

RELATED APPLICATIONS

This application claims benefit of U.S. Provisional Applications Ser. No. 60/442,879, filed on Jan. 27, 2003, entitled "Gyrocompass and Kinematic-Navigation-While-Slant-Drilling Dual or More Gimbaled Inertial System", and Ser. No. 60/400,465, filed on Aug. 1, 2002, entitled "High Accuracy Drillhead Navigation System". These applications are incorporated herein by this reference.

FIELD OF THE INVENTION

This invention relates to a navigation system for traversing a borehole. More specifically, the invention relates to a borehole navigation system that can determine position and attitude for any orientation in a borehole.

BACKGROUND OF THE INVENTION

For several reasons, it is essential to accurately monitor and guide the direction of the drill bit such that a borehole is created where desired. One reason is that it is expensive to drill a borehole at a cost of about $500,000 per day. Another reason is that it may be necessary by law for an oil rig to log the location of its boreholes at a regular frequency such that the oil rig can be properly monitored.

Many prior art systems have attempted to accurately and efficiently monitor the location of the drill bit to determine its location, but each system has had limitations. For example, the internal diameter of a drill pipe may not be large enough to fit the optimal number of typical navigation sensors. To overcome this obstacle, one prior art system removes the drill bit from the borehole and lowers a monitoring tool down the borehole to determine its current location. A disadvantage of this system is that it is costly to stop drilling and spend time removing the drill bit to take measurements with the monitoring tool.

To determine the location of a drill bit in a borehole, it is desirable to know the position and the attitude, which includes the vertical orientation and the north direction. To know the position, it is first desirable to know the attitude. Typically, gyroscopes can be used to determine the north direction, and accelerometers can be used to determine the vertical orientation. Prior art systems have used single orientation gyroscopes and/or single orientation accelerometers due to size limitations. However, these systems can suffer from long-term bias stability problems.

In another prior art system, single-axis accelerometers are used to determine the vertical orientation of the drill bit. A system such as this, however, does not provide the drill bit's orientation relative to north, which is necessary to determine the full location of a borehole: a system that uses accelerometers is typically only adequate if the oil rig is going to drill a vertical borehole, since an accelerometer system cannot determine north.

In other prior art systems, a magnetometer is used to determine the magnetic field direction from which the direction of north is approximated. However, systems such as these must make corrections for magnetic interference and use of magnetic materials for the drill pipe. Additionally, systems that rely only on magnetometers to determine north can suffer accuracy degradation due to the Earth's changing magnetic field.

The use of gimbals in a navigation system is desirable to calibrate the sensors and to compensate for the sensor biases such that the system can accurately determine attitude and position. A navigation system using gimbals may be more accurate by a factor of 100 compared to a non-gimbaled strapdown system. Moreover, a navigation system that uses two or more gimbals only requires the sensors to be stable for a few minutes, rather than for days, in comparison to a system that doesn't use gimbals.

One prior art system uses only a single gimbal for all sensors. However, this system does not allow simultaneous estimation of all sensor biases nor the estimation of the north and the vertical for all borehole orientations. Other systems have used gimbals within a gyro sensor, but this does not provide all axes of observability.

BRIEF SUMMARY OF THE INVENTION

It is therefore an object of this invention to provide a borehole navigation system with two or more gimbals that is the same or smaller in diameter than prior borehole navigation systems without gimbals or with a single gimbal.

It is a further object of this invention to provide such a borehole navigation system that can be placed within a drill pipe.

It is a further object of this invention to provide such a borehole navigation system that can determine position and attitude for any orientation of the borehole navigation system.

It is a further object of this invention to provide such a borehole navigation system that can average out the effects of gyro and accelerometer sensor bias errors and unwind the effects of gyro scale factor errors during navigation of the borehole navigation system.

It is a further object of this invention to provide such a borehole navigation system that allows gyro and accelerometer bias calibration and gyro scale-factor calibration as well as attitude determination during gyrocompassing.

It is a further object of this invention to provide such a borehole navigation system that has long-term performance accuracy with only short term requirements on sensor accuracy.

It is a further object of this invention to provide such a borehole navigation system that can determine position and attitude while drilling, when the drill bit is stopped, or when the drill bit is inserted or withdrawn.

It is a further object of this invention to provide such a borehole navigation system that can determine position and attitude while logging, both descending and ascending on a log line after the drill bit has been withdrawn.

The invention results from the realization that a smaller and more accurate omnidirectional borehole navigation system can be effected by using a gimbal system that includes at least one outer gimbal connected to a housing, and an inner gimbal nested in, and connected to, the outer gimbal, a three-axis solid state gyro assembly and a three-axis solid state accelerometer assembly both mounted on the inner gimbal structure, and a microprocessor responsive to gyro logic circuits and accelerometer logic circuits for determining the attitude and position of the housing in its borehole.

The invention features an omnidirectional borehole navigation system that includes: a housing for traversing a borehole; a gimbal system including at least one outer gimbal connected to said housing and at least one inner gimbal nested in and connected to said outer gimbal; a solid state three-axis gyro assembly mounted on said inner gimbal; a solid state three-axis accelerometer assembly mounted on said inner gimbal; gyro logic circuits on said inner gimbal responsive to said three-axis gyro assembly to produce the inertial angular rate about each gyro input axis; accelerometer logic circuits on said inner gimbal to produce the non-gravitational acceleration along each accelerometer input axis; and a microprocessor responsive to said gyro logic circuits and said accelerometer logic circuits for determining the attitude and the position of said housing in its borehole.

In a preferred embodiment of the omnidirectional borehole navigation system, the housing may include a pressure vessel. The housing may include a Dewar vacuum jacket. The housing may include a standoff structure for spaceably interconnecting the housing within a borehole drill pipe. The space between the housing and the inside of the drill pipe may form a drilling mud flow channel. The outer gimbal axis may extend longitudinally along the housing. The inner gimbal axis may extend laterally to the housing. The outer gimbal may include a drive motor for rotating the outer gimbal. The inner gimbal may include a drive motor for rotating the inner gimbal. The inner gimbal may be rotatable 180° in each direction. The inner gimbal may include a twist capsule device and the outer gimbal may include a slip ring device for electrically interconnecting the gyro and accelerometer logic circuits with the microprocessor. The solid state three-axis gyro system may include three, one-axis gyros. The solid state three-axis gyro system may include Micro-Electro-Mechanical System (MEMS) gyro system. The solid state three-axis gyro system may include a laser gyro system. The solid state three-axis gyro system may include a quartz gyro system. The solid state three-axis accelerometer system may include a MEMS accelerometer system. The solid state three-axis accelerometer system may include a quartz accelerometer system. The gyro logic circuits may include a field programmable gate array. The gyro logic circuits may include an application-specific integrated circuit. The accelerometer logic circuits may include a field programmable gate array. The accelerometer logic circuits may include an application-specific integrated circuit. The inner gimbal may include a plurality of stacked gimbal elements, one corresponding to each gyro axis and accelerometer axis. The microprocessor may command carouseling and indexing of the gimbals to average out the effects of gyro and accelerometer bias errors and unwind the effects of gyro scale factor errors. The microprocessor may command rotation of the gimbals to determine north and vertical directions, and to calibrate the gyro and accelerometer biases, to effect gyrocompassing. The gyro scale factors may be calibrated during the slew between gyrocompass positions. The microprocessor may also determine the velocity of the housing in its borehole.

The invention also features an omnidirectional borehole navigation system that includes: a housing for traversing a borehole; a dual gimbal system including an outer gimbal connected to the housing and at least one inner gimbal nested in and connected to the outer gimbal; a MEMS three-axis gyro assembly mounted on the inner gimbal; a MEMS three-axis accelerometer assembly mounted on the inner gimbal; gyro logic circuits on the inner gimbal responsive to the three-axis gyro assembly to produce the inertial angular rate about each gyro input axis; accelerometer logic circuits on the inner gimbal to produce the non-gravitational acceleration along each accelerometer input axis; and a microprocessor responsive to the gyro logic circuits and the accelerometer logic circuits for determining the attitude, the position and the velocity of the housing in its borehole.

In a preferred embodiment of the omnidirectional borehole navigation system, the outer gimbal axis may extend longitudinally along the housing. The inner gimbal axis may extend laterally to the housing. The gyro logic circuits may include a field programmable gate array. The gyro logic circuits may include an application-specific integrated circuit. The accelerometer logic circuits may include an application-specific integrated circuit. The accelerometer logic circuits may include a field programmable gate array.

The invention also features an omnidirectional borehole navigation system that includes: a housing for traversing a borehole; a gimbal system including an outer gimbal connected to the housing and an inner gimbal nested in and connected to the outer gimbal, the inner gimbal including a plurality of stacked inner gimbal elements; a MEMS three-axis gyro assembly, each axis of the gyro assembly mounted on one of the stacked inner gimbal elements; a MEMS three-axis accelerometer assembly mounted on the inner gimbal, each axis of the accelerometer assembly mounted on one of the stacked inner gimbal elements; gyro logic circuits on the inner gimbal responsive to the three-axis gyro assembly to produce the inertial angular rate about each gyro input axis; accelerometer logic circuits on the inner gimbal to produce the non-gravitational acceleration along each accelerometer input axis; and a microprocessor responsive to the gyro logic circuits and the accelerometer logic circuits for determining the attitude, the position, and the velocity of the housing in its borehole.

In a preferred embodiment of the omnidirectional borehole navigation system, each of the stacked inner gimbals may include a drive motor for rotating the corresponding inner gimbal element. The stacked inner gimbals may include a drive motor for rotating each of the stacked inner gimbal elements.

The invention also features an omnidirectional borehole navigation system that includes: a housing for traversing a borehole; a gimbal system including at least one outer gimbal connected to the housing and at least one inner gimbal nested in and connected to the outer gimbal; a solid state three-axis gyro assembly mounted within the housing; a solid state three-axis accelerometer assembly mounted within the housing; gyro logic circuits mounted within the housing and responsive to the three-axis gyro assembly to produce the inertial angular rate about each gyro input axis; accelerometer logic circuits mounted within the housing and responsive to the three-axis accelerometer assembly to produce the non-gravitational acceleration along each accelerometer input axis; and a microprocessor responsive to the gyro logic circuits and the accelerometer logic circuits for determining the attitude and the position of the housing in its borehole.

In a preferred embodiment of the omnidirectional borehole navigation system, the three-axis gyro assembly and the three-axis accelerometer assembly are mounted on the inner gimbal.

The invention also features a method for borehole navigation, including the steps of: providing a housing for traversing a borehole, the housing including a gimbal system having at least one outer gimbal connected to the housing and an inner gimbal nested in and connected to the outer gimbal, the gimbal system including a solid state three-axis gyro assembly and a solid state three-axis accelerometer assembly mounted within the gimbal system; obtaining information about a position of a first point in the borehole; determining the attitude of the first point in the borehole using the three-axis gyro assembly and the three-axis accelerometer assembly by rotating the gimbal system through four or more gyrocompass positions to determine gyro and accelerometer biases, and the Earth's rotation and gravity vectors; traversing through the borehole to a second point in the borehole; determining the attitude at the second point in the borehole using the three-axis gyro assembly and the three-axis accelerometer assembly; and determining the position of the second point in the borehole based upon information about the attitude at the first and second points in the borehole and the distance traversed from the first position to the second position in the borehole.

The invention also features a method for borehole navigation, including the steps of: providing a housing for traversing a borehole, the housing including a gimbal system having at least one outer gimbal connected to the housing and an inner gimbal nested in and connected to the outer gimbal, the gimbal system including a solid state three-axis gyro assembly and a solid state three-axis accelerometer assembly mounted within the gimbal system; obtaining information about a position of a first point in the borehole; determining the attitude of the first point in the borehole using the three-axis gyro assembly and the three-axis accelerometer assembly by rotating the gimbal system through four or more gyrocompass positions to determine gyro and accelerometer biases, and the Earth's rotation and gravity vectors; while traversing through the borehole and carouseling and/or indexing the gimbals, determining the attitude using outputs of the three-axis gyro assembly and propagating the position using the increment of drill pipe advance times the attitude; and Kalman filter updating the position of a second point in the borehole based upon the propagated position from the first point, information about the attitude from a gyrocompass at the second point, and the distance traversed from the first point to the second point in the borehole.

The invention also features a method for borehole navigation including the steps of: providing a housing for traversing a borehole, the housing including a gimbal system having at least one outer gimbal connected to the housing and an inner gimbal nested in and connected to the outer gimbal, the gimbal system including a solid state three-axis gyro assembly and a solid state three-axis accelerometer assembly mounted within the gimbal system; determining the attitude at the first point in the borehole using the three-axis gyro assembly and three-axis accelerometer assembly by rotating the gimbal system through four or more gyrocompass positions to determine gyro and accelerometer biases, and the Earth's rotation and gravity vectors; while traversing through the borehole and carouseling and/or indexing the gimbals, determining the attitude, position, and velocity by inertial navigation algorithms using the outputs of the three-axis gyro assembly and the three-axis accelerometer assembly to obtain an inertial navigation solution, and Kalman filter updating the inertial navigation solution using the increment of a drill pipe advance external aid; and Kalman filter updating the position of a second point in the borehole based upon the inertial navigation result for the second point, information about attitude from a gyrocompass at the second point, and the distance traveled from the first point to the second point in the borehole.

In each of the above described scenarios for navigating from the first position to the second position, the process may be repeated with the second position replacing the first position to navigate to a third position, etc.

BRIEF DESCRIPTION OF THE DRAWINGS

Other objects, features and advantages will occur to those skilled in the art from the following description of a preferred embodiment and the accompanying drawings, in which.

DISCLOSURE OF THE PREFERRED EMBODIMENT

Figure 1:
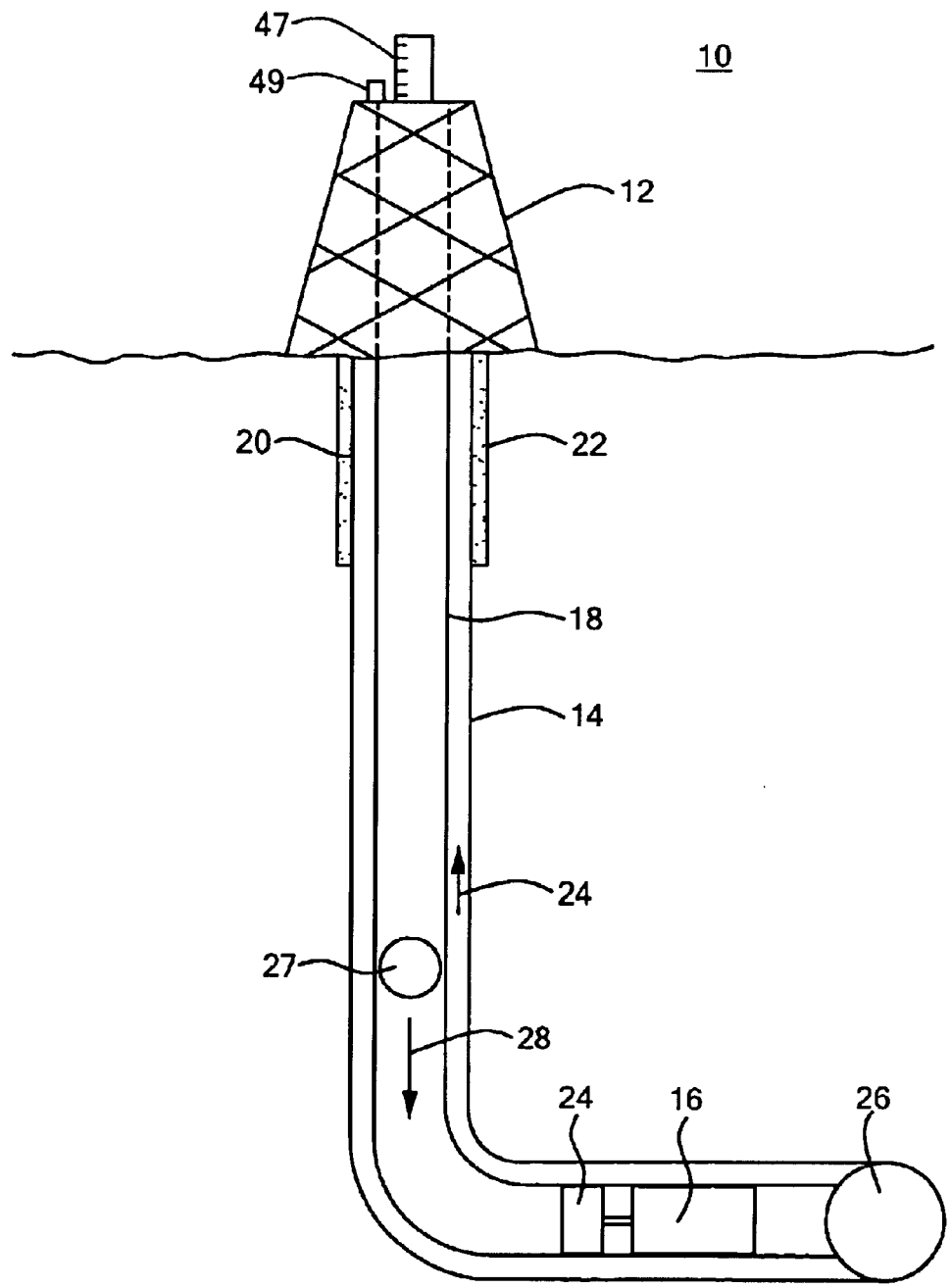
FIG. 1 is a cross-sectional schematic diagram of a drilling system that includes a borehole navigation system in a drill pipe in accordance with the present invention.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings.

There is shown in FIG. 1 a drilling system 10 that includes drilling rig 12 in borehole 14, and borehole mitigated navigation system 16. Drilling rig 12 may be located on top of an ocean surface or on a land surface. Borehole 14 includes one or more connected drill pipes 18 that are surrounded by steel casing 20 and cement liner 22. Navigation system 16 includes power section generator 24 and is adjacent to drill bit 26. While drilling, the mud flows to drive the drill bit, and also drives DC generator 24. Mud 27 is flowed down the inside of the drill pipe in the direction of arrow 28, and returns up the outside of the drill pipe in the direction of arrow 29 carrying away drill cuttings. Power section 24 provides electrical power to navigation system 16, and charges the battery used when mud is not flowing. The flow of mud stops when drilling is stopped to add a length of drill pipe. Navigation system 16 is configured to determine the vertical orientation and azimuth relative to north of navigation system 16 when drilling is stopped, and to navigate while drilling, such that it can provide the location for drill bit 26, which is located adjacent to navigation system 16. The navigation system may also include a temperature control system (not shown) as disclosed in a related U.S. patent application Ser. No. 10/408,704, filed Apr. 7, 2003, entitled "Environmentally Mitigated Navigation System", which is incorporated herein by reference.

Figure 2:
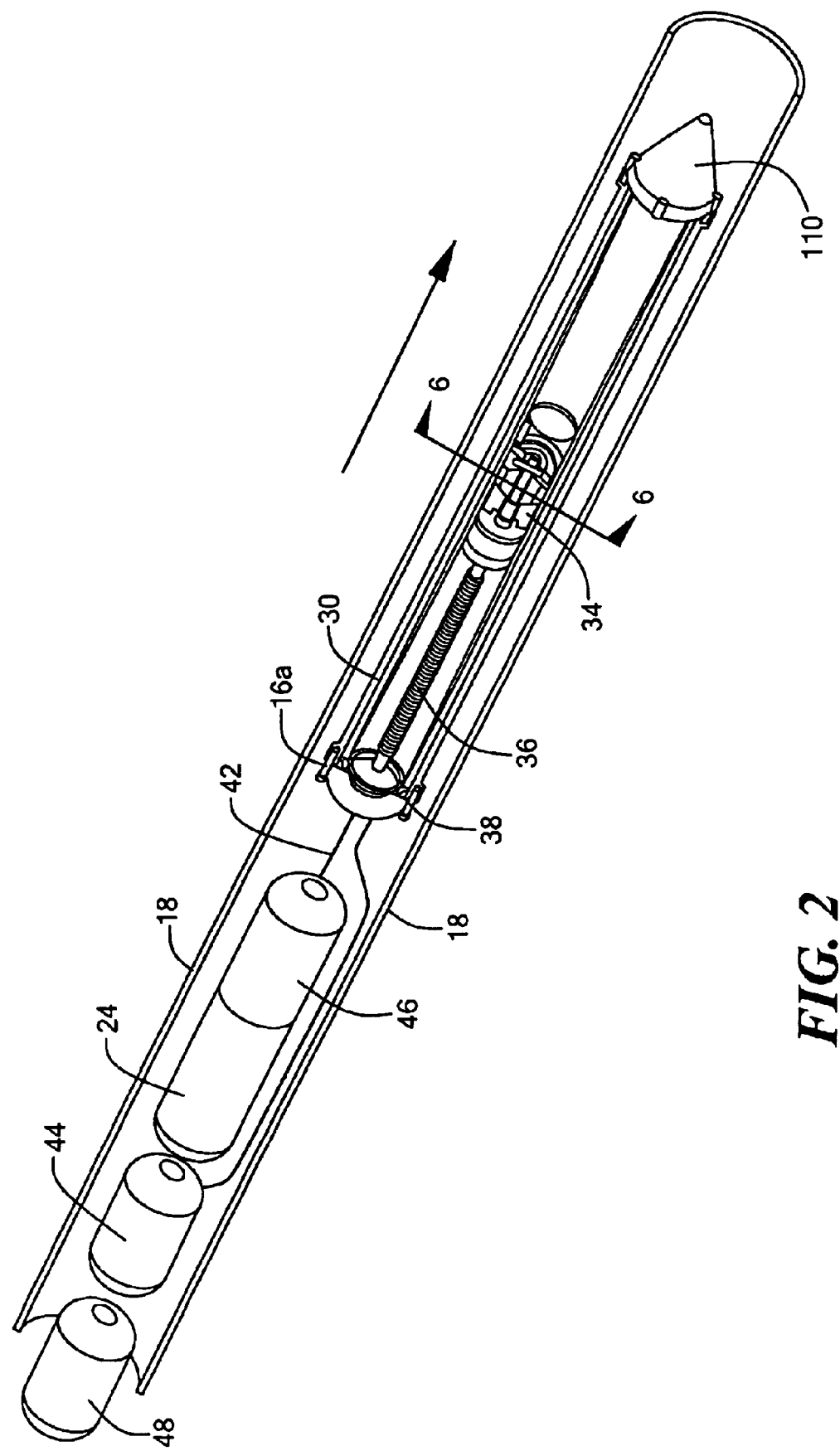
FIG. 2 is a more detailed cross-sectional schematic diagram of the borehole navigation system in a drill pipe shown in FIG. 1.

Navigation system 16a, FIG. 2, includes a housing pressure vessel 32, a gimbal system 34, a flexible heat pipe 36, thermoelectric coolers 38, and an end cap 40. Navigation system 16a may also include a mud pulse data communicator 44 and a ΔL device 48 for obtaining and transmitting the incremental distance advance of drill pipe in the borehole. Mud pulse data communicator 44 is coupled to navigator housing 32 through wire 46 and communicates navigation related information to an external device, such as a drilling rig, through drill pipe 18. ΔL device 48 communicates to navigation system 16a information relating to the incremental change in distance that navigation system 16a has traveled. Flexible heat pipe 36 conducts heat from the gimbal system 34 to the thermoelectric coolers 38.

ΔL device 48 can obtain information about the incremental distance advanced through any of a number of different methods. For example, each section of drill pipe can contain hash marks 47, FIG. 1, that are read by a scanning device 49 on the surface to determine how far each drill pipe has traversed down a borehole. ΔL information can then be transmitted to navigation system 16a through data communicator 44.

Figure 3:
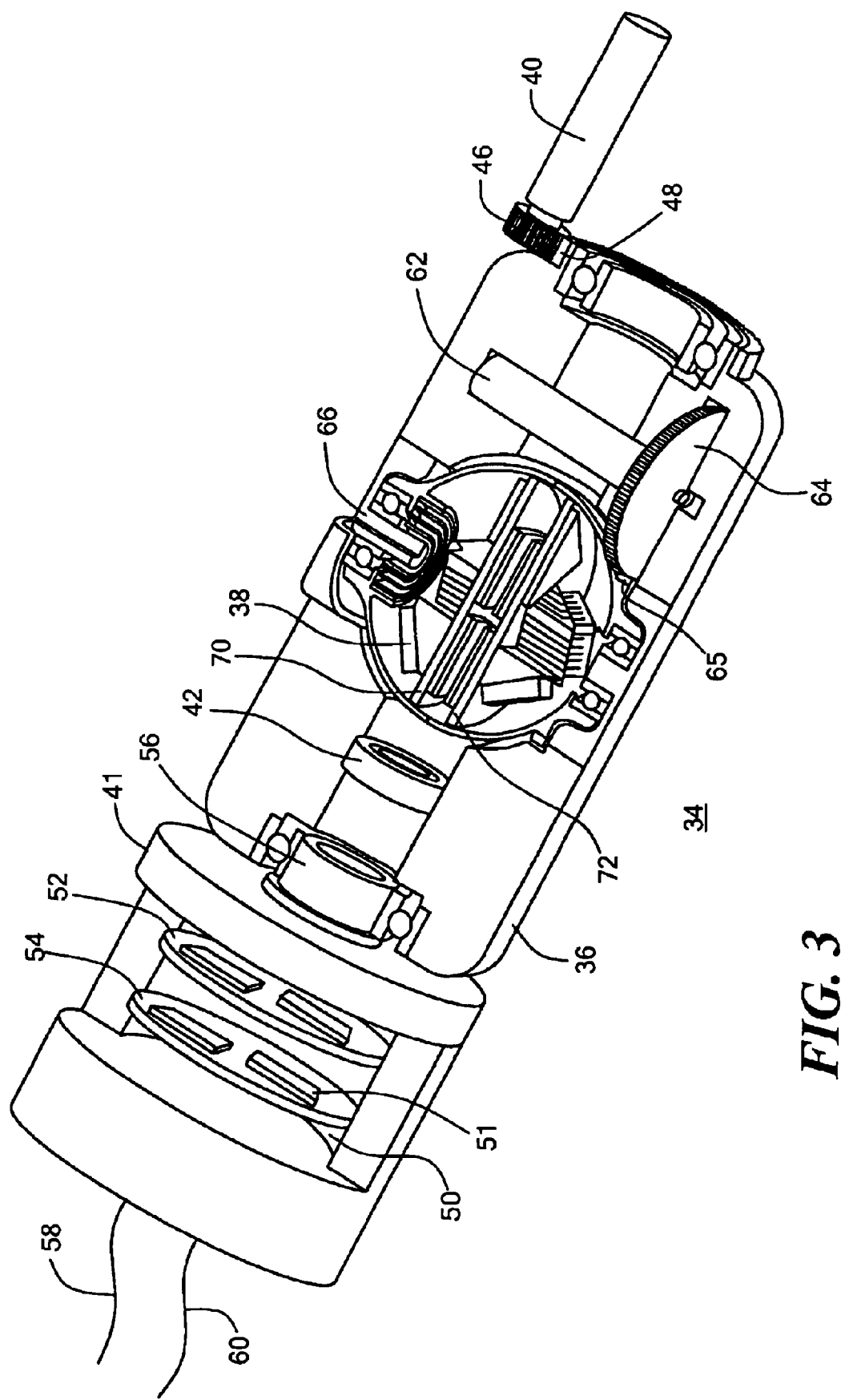
FIG. 3 is an enlarged, more detailed, cross-sectional schematic diagram of the gimbal assembly shown in FIG. 2.

Gimbal system 34, FIG. 3, includes an outer gimbal 36 and an inner gimbal 38. Outer gimbal 36 rotates about an axis longitudinally to the drill pipe. At one end, outer gimbal 36 is driven by outer axis motor 40, and at another end is supported by outer gimbal support 41. Outer gimbal 36 is driven by an outer gimbal motor 40 that drives a motor gear 46, which drives a gimbal gear 48 to rotate outer gimbal 36. Outer gimbal 36 also includes a gimbal angle readout and a slip ring 42 to transmit electrical signals to outside the outer gimbal.

Outer gimbal support 41 includes a cavity 50 that encloses a temperature controller printed circuit board 52 and a motor controller printed circuit board 54. Board 54 includes a microprocessor 51. Electrical signals from outer gimbal 36 are transmitted through slip rings 42 to boards 52 and 54 through an opening 56 in outer gimbal support 41. Outer gimbal support 41 includes wires 58 and 60 to transmit electrical signals to and from DC generator 24, FIG. 2, and mud pulse data communicator 44. Alternatively, rather than using slip ring 42, outer gimbal 36 could include a rotary transformer or other means for transmitting signals with complete rotary freedom.

Inner gimbal 38, FIG. 3, includes an inner axis motor 62 that drives gear 64, which drives inner gimbal gear 65. The inner gimbal 38 includes a twist capsule 66 for transmitting electrical signals from within the inner gimbal to the outer gimbal 36 and may include a gimbal angle readout. Twist capsule 66 is not necessary to the invention and could be replaced by a slip ring, a rotary transformer, or other rotary signal transfer device.

Figure 4:
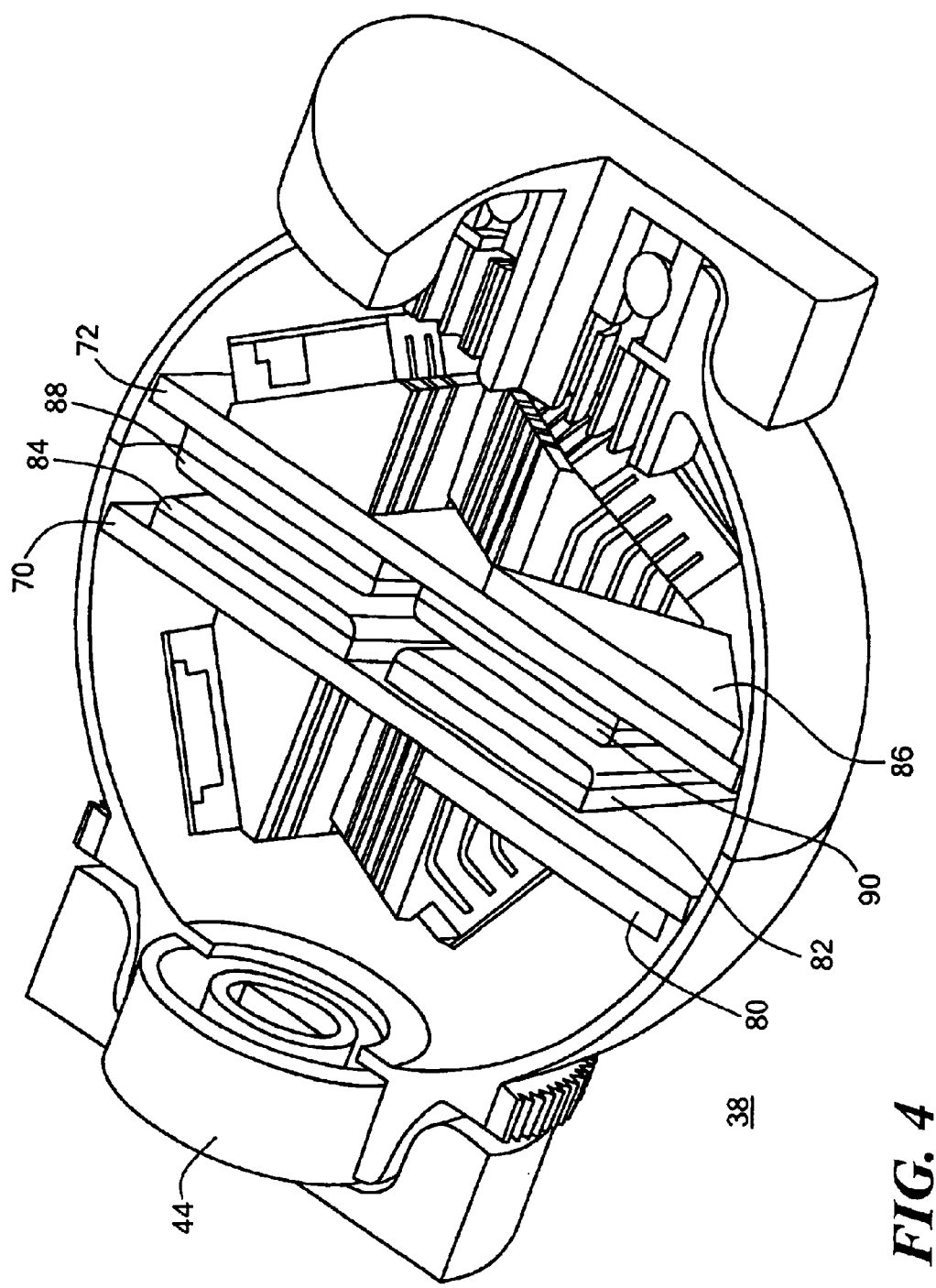
FIG. 4 is an enlarged, more detailed, cross-sectional schematic diagram of the inner gimbal shown in FIG. 3.
Figure 5A:
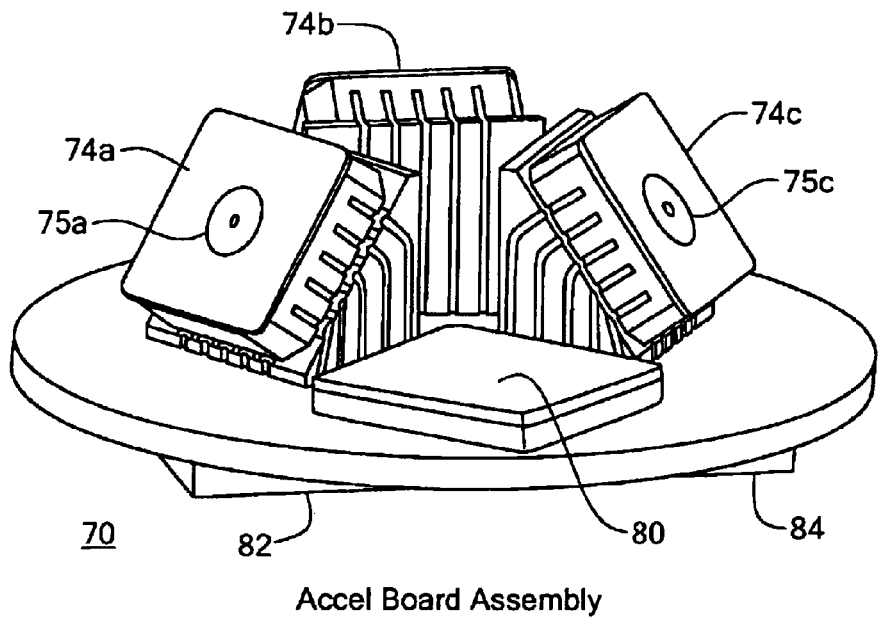
FIG. 5A is a more detailed schematic diagram of the accelerometer board assembly of FIG. 4.
Figure 5B:
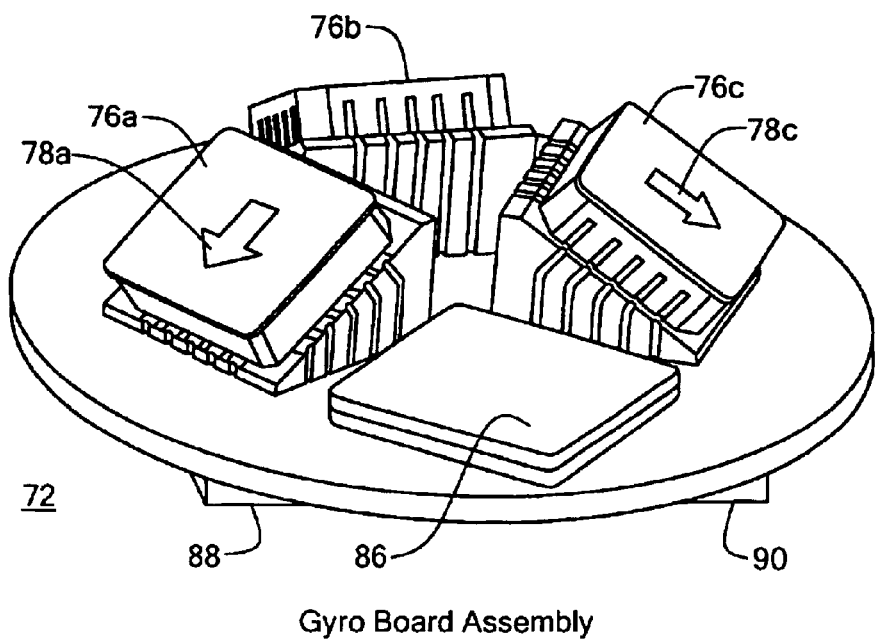
FIG. 5B is a more detailed schematic diagram of the gyro board assembly of FIG. 4.

Inner gimbal 38 includes an accelerometer board assembly 70, FIGS. 4 and 5A, and a gyro board assembly 72, FIGS. 4 and 5B. Accelerometer board assembly 70 includes three accelerometers 74a, 74b, and 74c that are each oriented orthogonally to each other as indicated in part by markings 75a and 75c. Gyroscope board assembly 72 includes three gyroscopes 76a, 76b, and 76c that are also oriented orthogonally to each other as indicated in part by lines 78a and 78c. The accelerometers 74a, 74b, and 74c and gyros 76a, 76b, and 76c may be MEMS sensors, such as those described in U.S. Pat. Nos. 5,126,812, 5,349,855 and 6,548,321, and PCT published application WO 03/031912 A2, all assigned to Draper Laboratory in Cambridge, Mass.

Accelerometer board assembly 70 includes logic circuits such as a field programmable gate array (FPGA) 80 and application-specific integrated circuits (ASICs) 82 and 84. Gyroscope board assembly 72 also includes logic circuits such as field programmable gate array 86 and application-specific integrated circuits 88 and 90.

Figure 6:
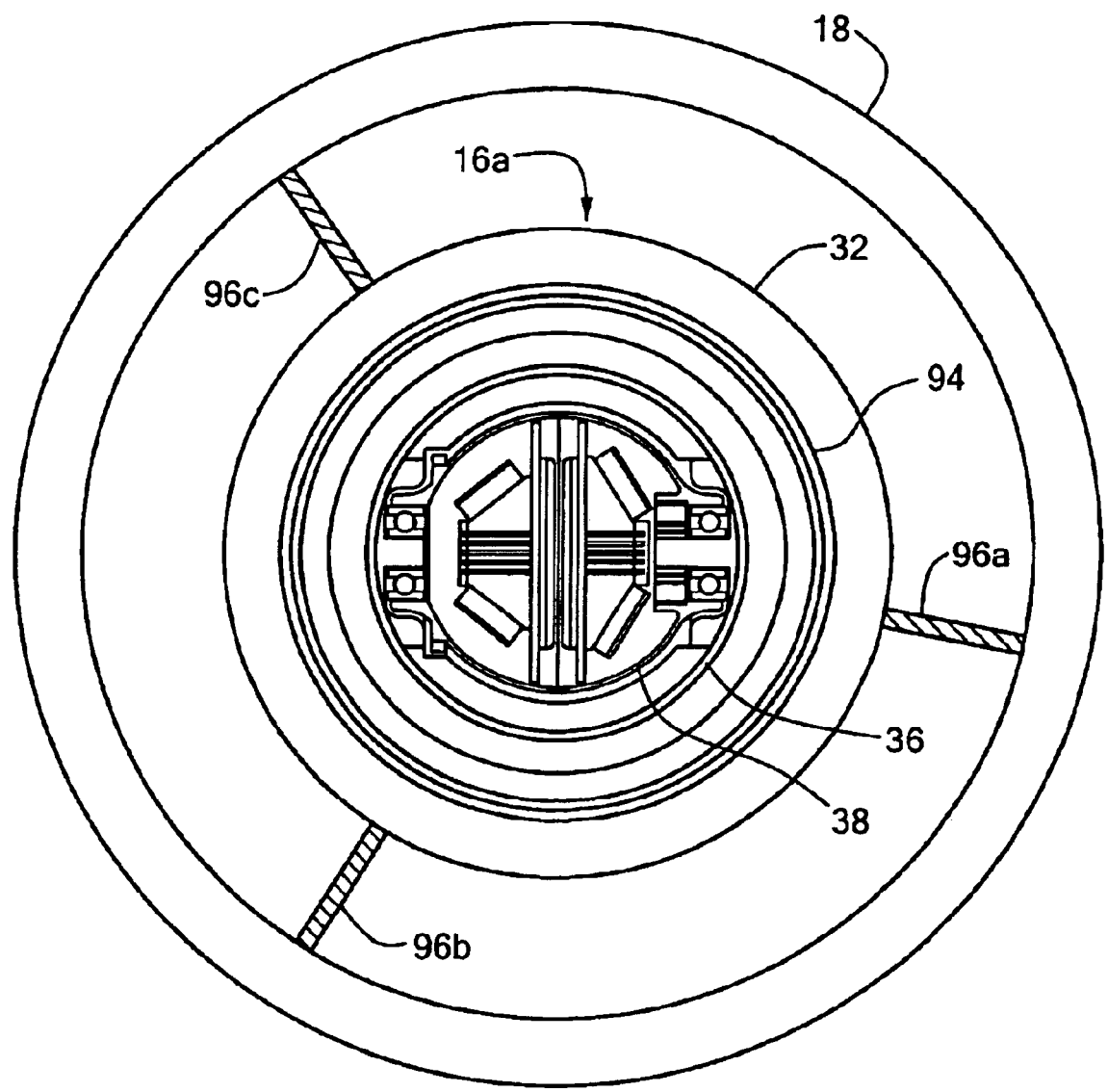
FIG. 6 is a cross-sectional schematic diagram of the borehole navigation system of FIG. 2 taken along the line 6—6 shown in FIG. 2.

Navigation system 16a includes a double-walled Dewar 94, FIG. 6, within housing 32 for providing thermal isolation. Navigation system 16a can be spaced from drill pipe 18 by one or more supports 96a–96c.

Figure 7:
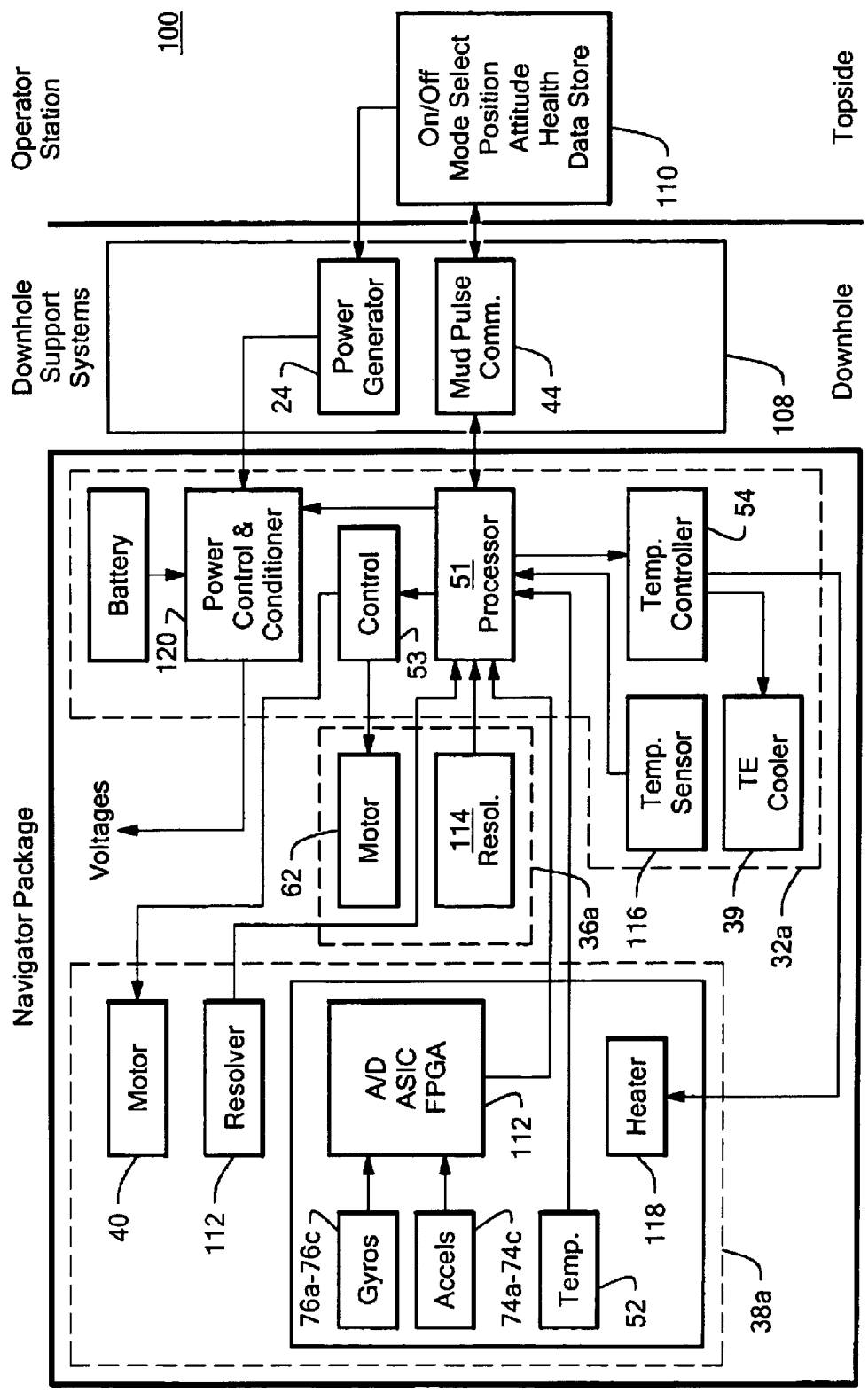
FIG. 7 is a functional block diagram of the borehole navigation system shown in FIG. 2.

A block diagram of navigation system 100, FIG. 7, includes elements from inner gimbal 38a, outer gimbal 36a, housing 32a, down-hole support system 108, and operator station 110. On inner gimbal 38a, information from gyroscopes 76a–76c and accelerometers 74a–74c are sent to inner gimbal logic circuits 112, which include an analog digital converter (A/D), ASICs, and FPGAs. An output signal from a logic circuit 112 is transmitted to processor 51 located on housing 32a. Temperature sensor 52 on inner gimbal 38a transmits temperature information to processor 51. A resolver 114 on outer gimbal 36a and perhaps a resolver 112 on inner gimbal 38a each transmit location information of their corresponding gimbal to processor 51. Processor 51 in turn transmits one or more signals to a control module 53 on housing 32a that transmits a signal to motors 62 and 40 on the outer gimbal 36a and inner gimbal 38a respectively, to control the orientation of each gimbal.

Processor 51 also accepts temperature information from temperature sensor 116 located on housing 32a about the housing temperature. In response to temperature information received from sensors 116 and 52, microprocessor 51 transmits a signal to temperature controller 54 which controls the operations of thermoelectric coolers 39 on housing 32a and heater 118 on inner gimbal 38a. Processor 51 also controls operation of a power control and conditioner module 120 that provides the appropriate voltages to electronics on inner gimbal 38a, outer gimbal 36a and housing 32a.

Mud pulse data communicator 44 communicates information in between processor 51 and operator station 110. Operator station 110 controls the operation of DC power generator 24 which transmits generated power to power control and conditioner 120. Operator station 110 controls general operation of the drilling and navigation system such as turning the drill on and off, selecting the mode of operation of proximity electronics, receiving information on the position and attitude of the navigation system, determining the health of the navigation system, storing data associated with the navigation system, and steering the drill if this is not done down-hole by processor 51.

Figure 8:
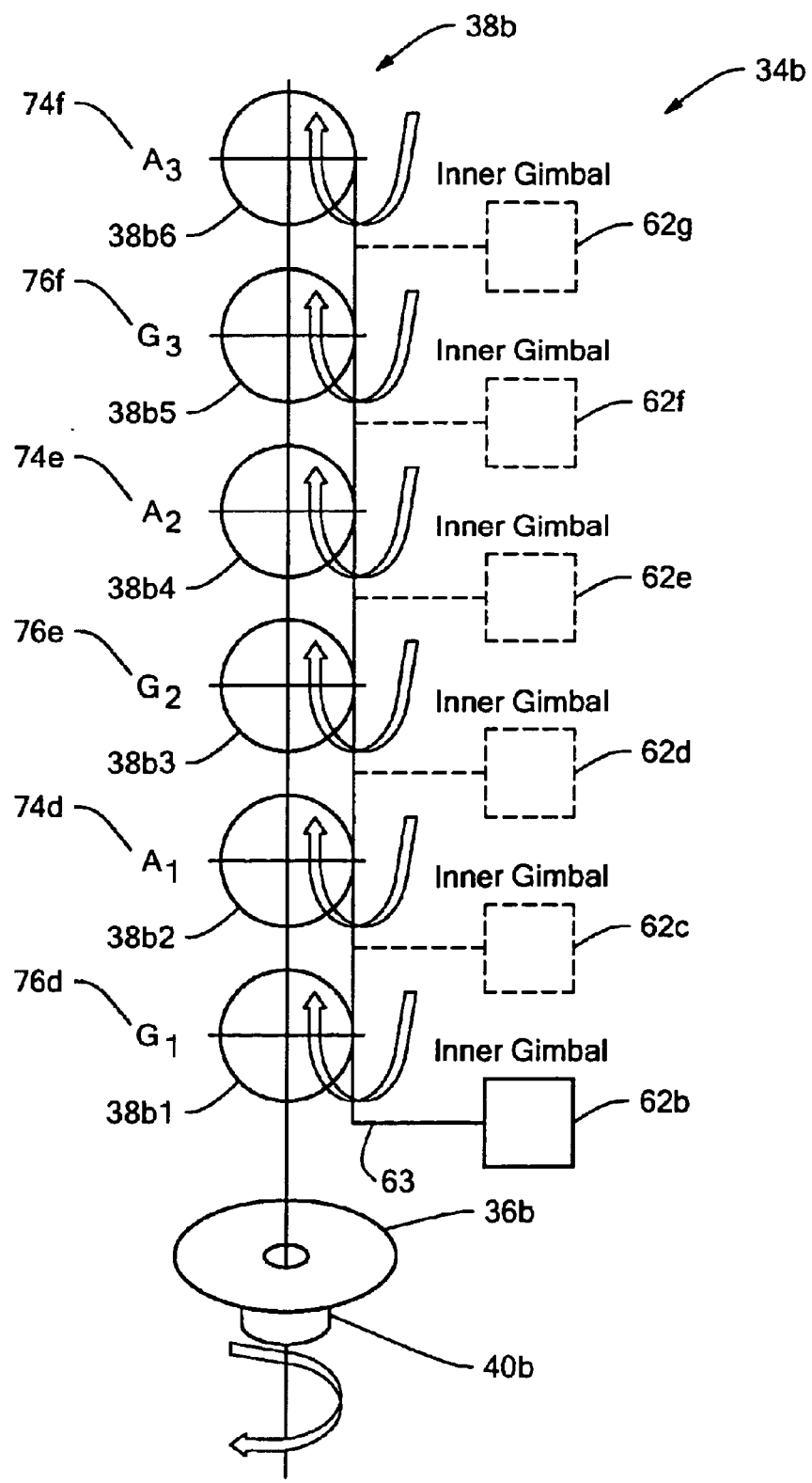
FIG. 8 is a schematic diagram of another embodiment of the borehole navigation system shown in FIG. 1 in which the housing includes one outer gimbal and six inner gimbals.

FIG. 8 shows another embodiment of gimbal assembly 34b that includes one outer gimbal 36b and six inner gimbals 38b1–38b6. Inner gimbals 38b1, 38b3, and 38b5 each have one gyro 76d, 76e, and 76f, respectively, located thereon and inner gimbals 38b2, 38b4, and 38b6 each have one accelerometer 74d, 74e, and 74f, respectively, located thereon. Gimbal motor 40b drives outer gimbal 36b and inner gimbal motor 62b drives each of the inner gimbals 38b1–38b6 through a gear chain 63. Alternatively, six gimbal motors 62b–64g could each drive one of inner gimbals 38b1–38b6. Each accelerometer 74d–74f and each gyro 76d–76f is located on a circuit board in a corresponding inner gimbal 38b1–38b6 and includes proximity electronics on the associated circuit board, including for example an ASIC and gate array. A sensor, such as a gyro or an accelerometer, may be on one side of the circuit board and the programmable gate array and ASIC may be on the other side.

The input axes of each of the gyros 76d–76f are mutually oriented orthogonally to each other, as are the input axes of the accelerometers 74d–74f. The input axes for the three gyros 76d–76f, and separately the three accelerometers 74d–74f, are preferably oriented orthogonally to each other by having the three accelerometers' or gyros' chip planes (if the sensors are MEMS devices) be three intersecting faces of a cube, with each cube face being on a separate gimbal and each gimbal axis being parallel to the diagonal of the cube that bisects the three cube faces. An inner gimbal axis thus makes an angle of arc cos(1/sqrt(3))=54.73 degrees with its sensor chip plane. Having the sensor chip plane at an angle to the gimbal axis creates a smaller diameter multi-gimbal structure within the drill pipe diameter.

The three gyro 76d–76f input axes and three accelerometer 74d–74f input axes are preferably mutually orthogonal at the two 180° degree apart inner gimbal stops, and in between if the inner gimbals rotate in parallel, which can be accomplished by using one inner gimbal motor 40b that drives a gear chain which rotates gyros 76d–76f and accelerometers 74d–74f stacked in an alternating configuration as shown in FIG. 8.

Each of the below described navigation while drilling techniques for FIGS. 9, 10 and 11 utilize as part of their approach a gyrocompass while a length of drill pipe is added to the drill string, such as 132 and 136 in FIG. 9, 152 and 162 in FIG. 10, and 172 and 184 in FIG. 11. During a gyrocompass, gyro and accelerometer data are collected at each of the four possible gimbal 180 degree cardinal orientations. Gyro data may also be collected during the slew between gyrocompass orientations. Least squares or Kalman filter estimation, as known to those skilled in the art, is used to determine the gyro and accelerometer biases, the Earth's rotation and gravity vectors, and from the slew data the gyro scale factors. From the Earth's rotation and gravity vectors in the outer gimbal frame, the attitude of the system relative to north and vertical is determined.

Figure 9:
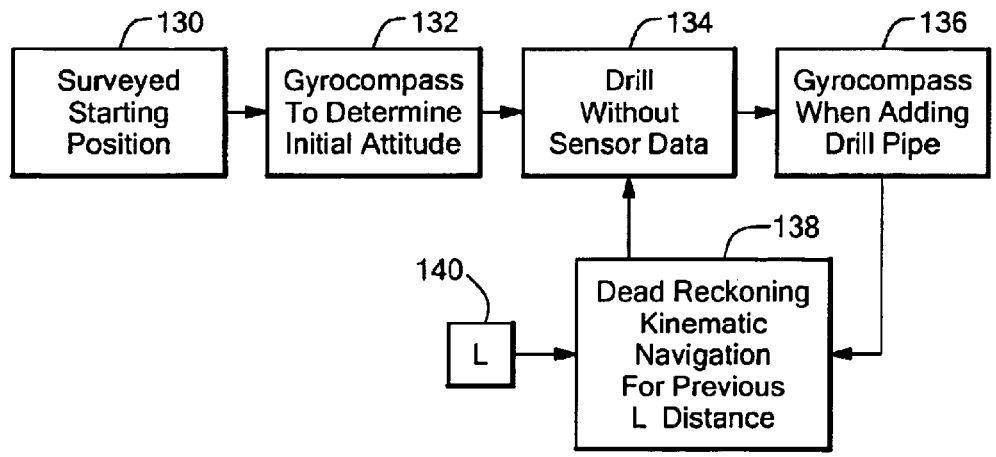
FIG. 9 is a flowchart showing a method of dead reckoning kinematic navigation while drilling that is used with the borehole navigation system of FIG. 2.
Figure 10:
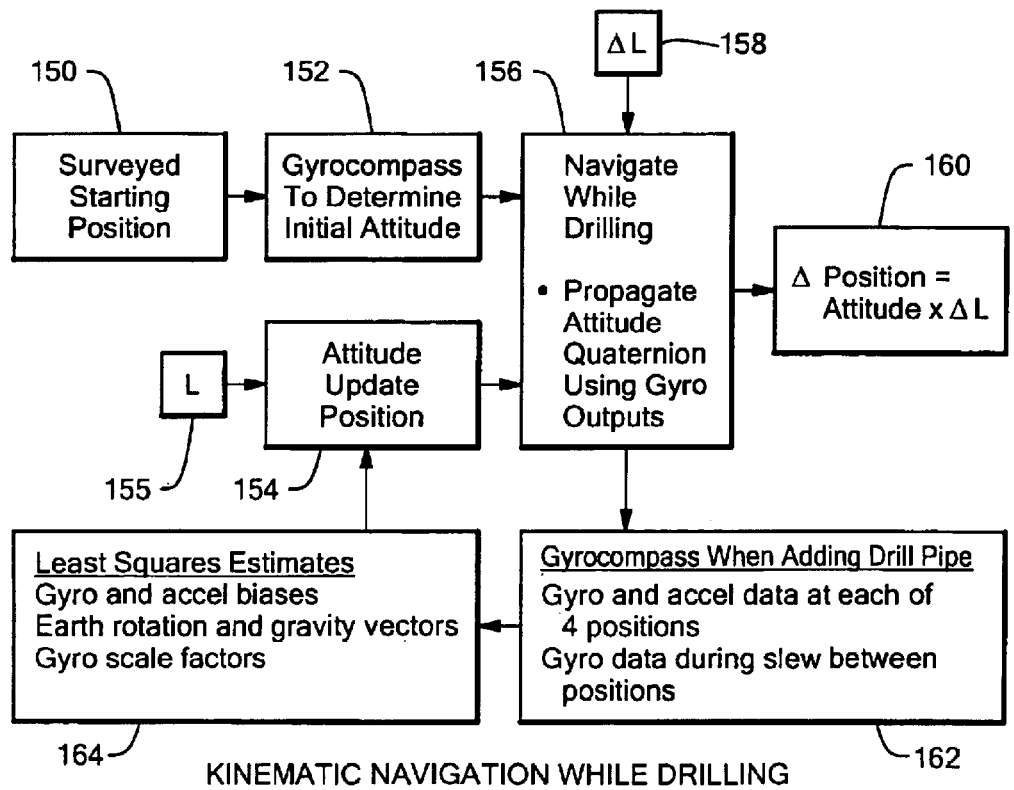
FIG. 10 is a flowchart showing a method of kinematic navigation while drilling that is used with the borehole navigation system of FIG. 2.

A common method for dead reckoning kinematic navigation while drilling begins at step 130, FIG. 9, with obtaining a surveyed starting position of the borehole. Typically, the starting point of the borehole can be very well surveyed, even on the ocean bottom under a drilling platform. For example, global positioning system (GPS) satellite radio navigation equipment can be used to determine the drilling rig position, which is then projected to the starting point of the borehole. At step 132, the initial attitude of the navigation system is determined by gyrocompassing, in which the inner and outer gimbals may be rotated. At step 134, drilling is performed without obtaining additional sensor data. At step 136, gyrocompassing is performed when an additional segment of drill pipe is added. The inner and outer gimbals may be rotated again at step 136. At step 138, the location of the navigation system is determined by using dead reckoning kinematic navigation, which is performed by using attitude information from the gyros obtained at steps 132 and 136 and the length of pipe (L) that was added to go from step 132 to step 136. The segment of added drill pipe, which may be thirty feet or other lengths, is typically known or can be accurately measured. Alternatively, at step 140, the length of added drill pipe (L) can be obtained from an external source. At step 134, drilling is again performed without taking additional sensor data, and the process 136, etc. repeated.

The navigation method of FIG. 9 does not depend on the particular thirty foot pipe length (presently standard in the drilling industry) chosen in the discussed example. Sometimes drill pipe is added in three thirty-foot segments, or a coil of continuous drill pipe is let down the hole so that drilling might be stopped only every 90 or several hundred feet.

Since borehole drilling will not necessarily follow a smooth minimum-curvature path from one gyrocompass location to the next, as is assumed in dead reckoning kinematic navigation, it may be desirable to navigate while drilling to the next gyrocompass location, in which the position of the initial point is propagated to the second point while drilling. To accomplish this, a method for kinematic navigation while drilling, FIG. 10, can be used, which begins at 150 with obtaining a surveyed starting position of the borehole. At step 152, the initial attitude of the navigation system is determined by gyrocompassing.

Kinematic navigation while drilling is accomplished at step 156, where attitude is propagated using the gyro outputs while the gimbals might be carouseled and/or indexed. Information about the amount the drill pipe advanced, $\Delta L$, is obtained at step 158, and at step 160, the increment in position is determined by multiplying the current attitude determined at step 156 by $\Delta L$. Alternatively, rather than knowing each $\Delta L$ increment while drilling, if it is known that the drill pipe has gone L=30 feet when the drilling stops, and the time duration required for drilling the thirty feet is known, then the kinematic navigation while drilling can be ex-post accomplished after the drilling using saved attitude information during drilling by assuming that the drill bit advanced at a uniform velocity.

At step 162, gyrocompass data is collected while drill pipe is added to the drill string, and the gyrocompass data processing is done at step 164. The navigation while drilling position is Kalman filter updated at step 154 using the gyrocompass attitude information and the length L of the drill pipe. L is measured in step 155, and the process is repeated at 156.

Figure 11:
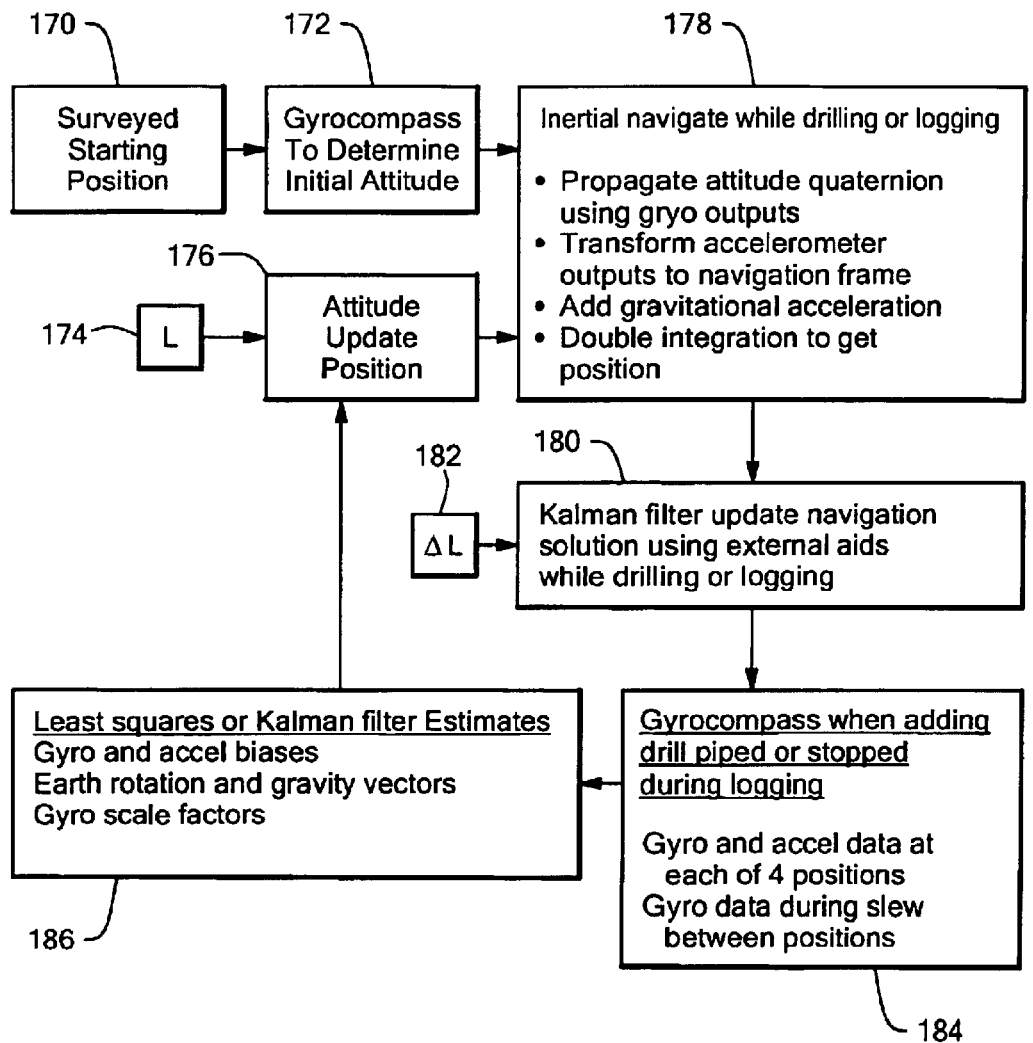
FIG. 11 is a flowchart of a method for inertial navigation while drilling or logging that is used with the borehole navigation system of FIG. 2.

If accelerometer data exists, i.e., if the accelerometer proof masses do not hit their stops during the shock and vibration of drilling, or if they only do so occasionally where navigation can be interpolated through the shock, then inertial navigation while drilling with external aids is preferably used as shown in FIG. 11. The method for inertial navigation, which uses accelerometer as well as gyro information, begins at step 170, FIG. 11, with obtaining a surveyed starting position. At step 172, the initial attitude of the navigation system is determined by gyrocompass.

Using the information obtained at step 172 (or at step 176 after the first position), inertial navigation at step 178 is accomplished by propagating the attitude using the gyro information, transforming the accelerometer outputs to a navigation frame, adding information from a gravitational acceleration model, and double integrating to get the position of the navigation system. At step 180, a Kalman filter update is performed using information about the incremental length of pipe $\Delta L$ obtained at step 182. While a length of drill pipe is added at step 184, gyro and accelerometer data are obtained during the gyrocompass scenario positions, and at step 186 a least squares or Kalman filter estimate is performed to determine the gyro and accelerometer biases, the Earth's rotation and gravity vectors, and gyro scale factors. At step 176, the attitude and position are Kalman filter updated using the length of pipe L information at 174, which result is used at step 178 to continue inertial navigation while drilling. The gimbals might be carouseled and/or indexed while inertially navigating while drilling.

With the method of FIG. 11, incremental pipe advance information $\Delta L$ used in the external aid Kalman filter update prevents the unbounded growth of inertial navigation errors, and typically gets similar propagation errors as that obtained in kinematic navigation. However, inertial navigation could have smaller error propagation because the accelerometer data provides extra information, provided that the accelerometers are not hitting their stops. An occasional overshock event can be tolerated, because the drill pipe advance is typically very slow and an occasional accelerometer outage can be interpolated through.

For inertial navigation, a model of the Earth's gravitation field is preferably used to add to the non-gravitational acceleration measured by the accelerometers. The deflection of the vertical due to gravity anomalies also is preferably modeled down the borehole to correctly interpret the result of vertical determination by the accelerometers in a gyrocompass.

The remaining description is to assist those skilled in the art in understanding the possible operation of one or more embodiments of the subject invention:

Gimbal Operation

In one embodiment of navigation between gyrocompassing, dual orthogonal gimbals 36 and 38, FIG. 3, can be commanded to rotate ±180° between stops, with a latch mechanism at each gimbal position. Thus, accurate gimbal readout and motion control is not needed if indexing only is utilized. However, in another embodiment, two, three or more gimbals continuously carousel during navigation between gyrocompassing.

The preferred hybrid method of operating the gimbals is with outer gimbal 36 capable of continuous multi-360° revolutions with slip rings and gimbal angle readout, and with inner gimbal 38 orthogonal to the outer gimbal capable of doing a +180° rotation, dwelling, and then a −180° rotation, etc., between stops with wire twist capsule and with or without gimbal angle readout. Inner gimbal 38 can be stopped at other positions, such as 90° between the 180° apart stops.

Continuous rotation of outer gimbal 36 and discrete indexing of inner gimbal 38 is preferable because the space available along the longitudinal axis of drill pipe 18 allows a more complicated outer gimbal 36 structure that permits drill pipe rotation during drilling to be converted to the desired carouseled motion by servoing the outer gimbal to the gyro integrated angle outputs plus the desired carousel angle motion. The simplified structure of inner gimbal 38 is consistent with the restricted diameter in drill pipe 18, and is adequate to allow the required gyrocompass scenarios. During navigating while drilling, continuous carouseling +360° and −360° of the outer gimbal, and discrete indexing +180° and then −180° of the inner gimbal, averages out the effects of gyro and accelerometer bias errors, and unwinds the effects of gyro scale factor errors insofar as the carousel and indexing motions is concerned.

Gyrocompassing Method

When drilling is stopped to add a length of drill pipe, a gyrocompass and other sensor calibration operation may be performed using data obtained at and between four cardinal gimbal positions 180° apart, as follows:

(1) At the first gimbal position (all gimbal angles zero), high rate data is collected and digitally filtered for a period of time from all sensors, which can include three orthogonal gyros, three orthogonal accelerometers, and a three-axis magnetometer if available. This period of time generally is on the order of one minute but can be greater or smaller depending on the trade between accuracy of attitude and drill delay time;

(2) Then the outer gimbal is commanded to rotate or index for +180° in about 1 or a few seconds more or less, as controlled by the gimbal angle readout (or between stops if readout does not exist). Since the rotation is for a precise 180°, data collected during this rotation and subsequent rotations can be used to calibrate gyro scale factors for gyros at known non-orthogonal input axis (IA) orientations relative to the gimbal directions. Hence, none of the three orthogonal gyro IAs should be orthogonal to both gimbal axis directions. For instance, one IA can be parallel to the outer gimbal when at the cardinal inner gimbal orientations and the other two IAs can be at 45° angles to the inner gimbal, or some other more equally spaced non-orthogonal-to-gimbal orientation for the orthogonal set of gyro input axes, such as in FIGS. 4 and 5B;

(3) Data is collected at the second gyrocompass orientation for a minute more or less;

(4) The inner gimbal is indexed +180° between its stops with data being collected during the rotation;

(5) Data is collected at the third gyrocompass orientation for a minute more or less;

(6) The outer gimbal is indexed or rotated −180° with data being collected during the rotation. It is important for calibration reasons that the outer gimbal be rotated −180° rather than +180°, even though the outer gimbal has complete rotary freedom. The effects of gyro bias and the Earth's rotation rate increases the magnitude of the integral of the gyrocompass output in a 180° rotation for one direction of rotation, and decreases this magnitude for the other direction of rotation. Thus even if not included exactly correctly in analyzing the data, the gyro scale factor calibration using the combined +180° and −180° slews is insensitive to these effects;

(7) Data is collected at the fourth gyrocompass orientation for a minute more or less; and (8) The inner gimbal is indexed −180° with data being collected during the rotation, where the second inner gimbal rotation has to be in the opposite direction of the first, because of the inner gimbal stops and for the same reasons as described in step (6).

Gyrocompass Data Processing

From the data at the four fixed gyrocompass orientations compensated for thermal variations, the gyroscope, accelerometer, and possibly magnetometer biases are calibrated, and the vector components of the local vertical gravity, of the Earth's rotation angular velocity, and possibly of the Earth's magnetic field in the outer gimbal frame may be calculated, as described below. These quantities may also be estimated from the data obtained during continuous rotation of the gimbals or at other positions. The accuracy of the Earth's gravity vector estimate depends on the short term stability of the accelerometer biases and the long term stability of the accelerometer scale factors, whereas the accuracy of the Earth's angular velocity estimate depends only on the short term stability of the gyro biases and scale factors, since the gyro scale factors are calibrated in the slew between gyrocompass positions.

The data from MEMS gyroscopes and accelerometers may be A/D sampled at up to approximately 5 MHz. Digital signal processing and digital filtering is performed on the data with output to processor 51 in FIG. 7 at approximately 600 Hz or 1 kHz. At each gyrocompass position, the gyro angle rate data and the accelerometer acceleration data at the 600 Hz or 1 kHz sample rate are multiplied by the sample time interval and accumulated to get the accumulated gyro angle output and the accumulated accelerometer velocity output as functions of time. The slopes of least squares straight line fits to the accumulated data gives the average gyro rate data and the average accelerometer acceleration data at each of the four gyrocompass positions for three orthogonal gyros and three orthogonal accelerometers. Or some other filter, such as a Kalman filter, can be used to get the average of the sensor outputs at each gyrocompass position.

If the gyrocompass information is used to determine azimuth, the assumption is preferably made that drill pipe 18 is stationary during the gyrocompass operation. Since the drill pipe is lifted off the bottom of the hole when a length of pipe is added, there could be some rotation of the drill pipe. The magnetometer data could be biased in its measurement of the Earth's magnetic field direction, but the change in magnetometer direction determination between the start and end of data taking at each gyrocompass position and across all four gyrocompass positions can be used to correct the gyro data and the accelerometer data for the rotation of the drill string during the gyrocompass operation, if there were a three-axis magnetometer in the system.

A better alternative would be to extend a brake against the borehole wall to prevent the drill pipe from rotating during the gyrocompass operation. However, the use of a brake might not be possible. For instance, when drilling from a ship that is not rigidly attached to the ocean bottom, the ship and drill pipe could be going up and down with wave motion. The motion of the ship could be very accurately monitored with sub-centimeter accuracy phase tracking GPS receivers, and this information sent to the navigation system at the bottom of the drill pipe, if adequate communications exist. Therefore, the period, phase, and amplitude (after modeling of the elasticity of the drill pipe) of the up and down motion and any excited rotary motion would be known and appropriate signal processing could separate out the DC levels of the gyroscope and accelerometer outputs. Long enough dwells at each gyrocompass position could also be used to separate out the DC values of the sensor outputs at each gyrocompass position.

In the following, the formulas are given for gyrocompassing assuming no rotation.

The transformation from the inner gimbal frame to the outer gimbal frame is given by:

$$\begin{bmatrix} 1 & 0 & 0 \\ 0 & \cos\theta_o & \sin\theta_o \\ 0 & -\sin\theta_o & \cos\theta_o \end{bmatrix} \begin{bmatrix} \cos\theta_i & \sin\theta_i & 0 \\ -\sin\theta_i & \cos\theta_i & 0 \\ 0 & 0 & 1 \end{bmatrix} \quad (1)$$

where $\theta_i$; $\theta_o$ are the inner and outer gimbal angles, respectively.

Assume that the gyro and accelerometer input axes (IA) in the inner gimbal frame have the orientations $$IA_1 = \begin{bmatrix} 1 \\ 0 \\ 0 \end{bmatrix}, \quad IA_2 = \begin{bmatrix} 0 \\ \cos 45° \\ \sin 45° \end{bmatrix}, \quad IA_3 = \begin{bmatrix} 0 \\ -\sin 45° \\ \cos 45° \end{bmatrix} \quad (2)$$

with $IA_1$ parallel to the outer gimbal axis at the cardinal gyrocompass positions and $IA_2$ and $IA_3$ at 45° angles to the inner gimbal axis.

Let $(\omega_1, \omega_2, \omega_3)$ in the outer gimbal frame be the input to a sensor (Earth's rotation inertial angular velocity for a gyro, specific force or nongravitational acceleration reaction up to gravity pulling down for an accelerometer).

Let $S_j$ be the scale factor and $B_j$ the bias of sensor j (j=1, 2, 3 for gyros and for accelerometers). The output of a triad of sensors, either gyros or accelerometers, at the four cardinal index positions of the gimbals are given in Table 1 below.

TABLE 1

Sensor outputs at dual gimbal gyrocompass cardinal positions

| Position | Sensor 1 | Sensor 2 | Sensor 3 |
|---|---|---|---|
| $\theta_i = 0°, \theta_o = 0°$ | $+S_1\omega_1 + B_1$ | $+S_2\omega_2 \cos 45° +S_2\omega_3 \sin 45° + B_2$ | $-S_3\omega_2 \sin 45° +S_3\omega_3 \cos 45° + B_3$ |
| $\theta_i = 180°, \theta_o = 0°$ | $+S_1\omega_1 + B_1$ | $-S_2\omega_2 \cos 45° -S_2\omega_3 \sin 45° + B_2$ | $+S_3\omega_2 \sin 45° -S_3\omega_3 \cos 45° + B_3$ |
| $\theta_i = 180°, \theta_o = 180°$ | $-S_1\omega_1 + B_1$ | $+S_2\omega_2 \cos 45° -S_2\omega_3 \sin 45° + B_2$ | $-S_3\omega_2 \sin 45° -S_3\omega_3 \cos 45° + B_3$ |
| $\theta_i = 0°, \theta_o = 180°$ | $-S_1\omega_1 + B_1$ | $-S_2\omega_2 \cos 45° +S_2\omega_3 \sin 45° + B_2$ | $-S_3\omega_2 \sin 45° +S_3\omega_3 \cos 45° + B_3$ |

If the orthogonal gyro and accelerometer IA orientations differ from those in equation (2), such as in FIGS. 5A and 5B, because, e.g., of packaging considerations, while still having the gyro IAs not orthogonal to all gimbal axes, then some other expressions than those in Table 1 for the theoretical values of the measurements would result. However, there would still be complete observability into the Earth's rate and gravity vector components in the outer gimbal frame.

Given the accelerometer scale factors (from surface calibrations) and the twelve average accelerometer measurements at four positions, one can then estimate the gravity vector and the accelerometer biases. Given the gyro scale factors either from surface calibrations or from calibration during the slew between gyro positions and the twelve average gyro measurements at four positions, one can then estimate the Earth's rotation inertial angular velocity vector and the gyro biases. Least squares or Kalman filter estimation can be used, where there are no perfect correlations between estimated parameters.

Knowing the local vertical vector and the Earth's rotation angular velocity vector in the outer gimbal coordinate frame, the horizontal north direction is calculated (if away from the Earth's poles). Hence the azimuth and local vertical orientation of the drill bit has been determined, so that the operator can properly steer the drill bit, or the steering can be autonomously done by the computer 51 in the drill pipe (if there is a means to steer at the drill bit or along the drill string in a closed loop).

Borehole Gravimetry

Non-vibrating (pendulous or translational proof mass) MEMS accelerometers may allow local vertical determination with required accuracy, even if the gravity magnitude measurement is not made with sufficient accuracy for geophysical survey purposes. Oscillating type accelerometers, where proof masses put opposing silicon or quartz resonators into tension and compression under acceleration and the measure of acceleration is the difference frequency of the resonators, can possibly have the required long term scale factor stability for determining the gravity magnitude (length of gravity vector measured in the gyrocompass operation) with sub-$\mu$g accuracy, with only short term stability required of the biases for MEMS oscillating accelerometers that fit within the small dual-gimbaled borehole navigation system.

Sub-$\mu$g performance is possible with increased accelerometer proof mass, although the proof mass is thereby more likely to hit its stops during the shock and vibration of drilling. However, the kinematic navigation while drilling approach only needs the gyro data while drilling, whereas the gyrocompass while not drilling needs both the gyro and the accelerometer data, as does aided inertial navigation while drilling.

Calibration of Gyro Scale Factors during Gyrocompass Slews

From the data taken during gimbal ±180° slews between gyrocompass positions compensated for thermal variations, the gyro scale factors may be calibrated. The thermal sensitivity model coefficients (which may be calibrated topside before drilling commences) have only to provide corrections for small temperature variations over a few minutes.

For a gyro IA along a gimbal rotation axis, the integral of the gyro angle rate data during the gimbal 180° slew should equal 180° plus the effect of bias plus the effect of the Earth's rotation rate during the slew. For a gyro IA at some fixed angle to a gimbal rotation axis such as 45°, the integral of the gyro angle rate data during the gimbal 180° slew should equal 180° cos(45°) plus the effect of bias plus the effect of the Earth's rotation rate during the slew. For a slew into stops for which there are no gimbal angle readouts during the slew, a time scenario can be assumed (as derived from laboratory experiments on gimbal motor performance) for calculating the effect of the Earth's rotation rate during the slew.

Since the integral of a gyro's output from the +180° slew is of the opposite sign from that from the −180° slew (for a gyro not orthogonal to the given gimbal axis), the effects of gyro bias and the Earth's rotation rate will increase one by the same amount that it decreases the other, if the same pattern of time history of gyro IA relative to the Earth's rotation vector is repeated in the reverse direction in the two slews.

The estimate of the gyro scale factor SF given by:

$$SF = \frac{|\text{integral of gyro output for} + 180° \text{ slew}| + |\text{integral of gyro output for} - 180° \text{ slew}|}{2 \times 180° \times \cos(\text{angle of } IA \text{ to gimbal axis})}$$

is therefore insensitive to the effects of the Earth's rotation rate and the gyro bias.

If the gyro IA is not orthogonal to both pairs of ±180° slews, then the gyro scale factor estimate is preferably taken to be the average of the two estimates, or the weighted average with the weights being the cosines of the angles of the IA to the gimbal axes.

Nominal (topside or last calibration) values for the gyro scale factors are assumed during the gyro estimations as described above for the gyrocompass data processing. Then the resulting gyro bias and the Earth's rotation vector estimates are preferably applied to estimating the gyro scale factors during the 180° slews. These gyro scale factor estimates preferably are then used to repeat the gyrocompass estimates of gyro biases and the Earth's rotation axis direction, and then the gyro scale factor slew estimates are repeated with the new values of gyro biases and the Earth's rotation direction, etc., the iteration continuing until convergence is obtained. Alternatively, a nonlinear least squares estimate can be made of all the parameters simultaneously from all the gyrocompass and slew data combined.

It is assumed that the angles between the sensor axes and the gimbal axes and scale factor, bias, and alignment temperature sensitivities may be calibrated topside by putting the system on a multi-axis test table and slewing and tumbling about various table axes for various MEMS navigation system gimbal orientations and various temperatures. Also, possibly calibrated topside are any accelerometer $g^2$ sensitivities, any gyro g sensitivities, and any gyro scale factor nonlinearities between sensing high slew rates and low earth-rate inputs.

Accuracy of Sensor Data

The accuracy of measurements at a given gyrocompass orientation depends on the gyro rate white noise (which causes angle random walk), the accelerometer acceleration white noise (which causes velocity random walk), other sensor noise processes, and the stability of the accelerometer scale factor. The accuracy of the measurement at a given gyrocompass position will in general improve as the square root of the time at the position. However, the time at a position cannot be increased much beyond one or a few minutes, because four times this dwell time should not be much longer than the time it takes to add a new length of drill pipe, due to the very large cost of any down time during the drilling process.

Since the 180° slew between positions takes much less time than the gyrocompass dwells at the positions, the scale factor calibration can be less accurate than the gyrocompass calibration, offset however by having a larger rate input during the slew. Preferably, there are commensurate times for dwelling at a position and for slewing between positions. For instance, if the gyrocompass accuracy can measure the Earth's rotation vector direction to $10^{-3}$ radians, then the gyrocompass slew calibration should measure gyro scale factor to at least a part-in-a-thousand accuracy, unless the gyro scale factor were adequately stable from the surface calibration. Better scale factor accuracy is desirable for navigating while drilling, but the requirements while drilling can be ameliorated by outer gimbal ±360° carouseling relative to inertial space and by ±180° inner gimbal indexing during drilling, and by external aids (such as from length of pipe going down the drill hole and from magnetometer data, as described below).

The technology of the MEMS gyro allows sub-degree-per-hour gyro resolution (improving with time) and the capability to measure hundreds of degrees-per-second rotations. In one embodiment of a MEMS gyro, the variation in the induced charge on a vibrating capacitor plate from a charge on a stationary capacitor plate is measured, where the same voltage reference that puts the charge on the stationary plate is used as a comparator in the A/D conversion of the voltage from the charge on the vibrating plate. Therefore, the measurement of angle rate is insensitive to first order to the inaccuracy of the voltage reference.

The above described gyrocompassing and calibration scheme and the below described kinematic or inertial navigation schemes between gyrocompasses could be accomplished by carouseling, e.g., slower continuous ±360° rotations about two or more axes. The rapid ±180° indexing on the inner gimbal and ±180° rotation on the outer gimbal with dwells at the cardinal gyrocompass positions is described herein, because it typically results in simpler and more compact gimbal hardware for fitting within the drill pipe.

Carouseling and Indexing to Average Out the Effect of Bias Errors during Navigating while Drilling In order to average out the effect of gyro and accelerometer bias errors during navigation while drilling, the inner gimbal is indexed +180° and then −180° between its stops about every minute. The outer gimbal axis is also carouseled +360° and then −360° at an inertial carousel rate that is half (or some other fraction) of the indexing rate to similarly average out the effect of gyro and accelerometer bias errors. The outer gimbal could be indexed ±180° instead, but since the outer gimbal has continuous rotation capability the carousel approach is preferred. The inner gimbal axis could also be carouseled instead of indexed.

In order to carousel the outer gimbal axis, add an increasing ramp in angle to the integral of the virtual gyro g output to which the outer gimbal control is servoed, and then add a decreasing ramp in angle. Since no gyro IA is necessarily directly along the outer gimbal axis, choose the virtual gyro $g=\lambda_1 g_1+\lambda_2 g_2+\lambda_3 g_3$ to have output that is the linear combination of real gyro $g_1$ outputs, which is along the outer gimbal axis. Attitude quaternion propagation is done during indexing and carouseling as well as between indexing.

Servoing the outer gimbal to the gyro integrated angle outputs plus the desired carousel angle eliminates the effect of gyro scale factor errors due to drill pipe rotation. The ±360° outer gimbal inertial carouseling and the ±180° inner gimbal indexing to average out the effect of gyro and accelerometer bias errors also unwinds the effect of gyro scale factor errors due to the carouseling and indexing (but not due to any small lateral angular motion of the drill pipe). If the carouseling were always in one direction, then the effect of gyro scale factor errors due to carouseling would build up continuously, which is why there is a periodic reversal of outer gimbal carousel direction. The existence of stops requires that there is reversal of inner gimbal indexing direction, which is also needed to unwind the effect of gyro scale factor errors due to the indexing motion.

The canceling of the effect of gyro and accelerometer bias errors that are constant during the carouseling or indexing cycle is only exact if the carouseling or indexing is relative to inertial space. This of course occurs with gyro control of the outer gimbal carousel axis, but does not exactly occur for the inner gimbal axis, the small discrepancy being due to any small drill pipe lateral angular rotation and to the Earth's rotation during the short carouseling and indexing cycle durations. This therefore provides only a first order canceling of errors. However this method also may include any manner of moving the gimbals which exactly cancels out the gyro and accelerometer bias errors.

To do carouseling or indexing relative to inertial space, three or more gimbals would be required. Inner gimbal ±180° indexing into stops with latches, with twist capsules and with or without gimbal angle readouts along with outer gimbal ±360° carouseling with slip rings and gimbal angle readout while canceling drill pipe rotation as seen by the sensors is a practical way to get most of the bias error cancellation, gyro scale factor error unwinding, gyrocompassing calibration, and other benefits that multiple gimbals allow, without having more than two gimbals. However, this invention also covers carrying out the described schemes with more than two gimbals either with indexing or carouseling.

Navigation while Withdrawing and Inserting Drill String

When the drill string is withdrawn to change the drill bit, navigation may be performed starting from the last navigated position while drilling and with initial attitude determined by a gyrocompass. The drill string is typically withdrawn 90 feet (3 pipe lengths) during which kinematic or inertial navigation is done while carouseling and/or indexing the gimbals (see FIGS. 10 and 11). While the drill pipe is removed from the drill string, a gyrocompass is done, and then kinematic or inertial navigation is done while withdrawing the next 90 feet of pipe. External aid is provided by the incremental and total length of pipe removed from the borehole.

When the drill string is reinserted after changing the drill bit, navigation may be performed starting from the initial surveyed position and with initial attitude determined by a gyrocompass. The above described process for navigating while withdrawing the drill string is done while inserting the drill string in 90 foot sections (3 pipe lengths), or whatever other length is used.

Navigation while Logging

Embodiments of navigation system 16 may be used to perform aided inertial navigation while logging (see FIG. 11). The logging operation is done fairly rapidly, so there is less time for inertial navigation errors to build up. The accelerometers do not hit their stops, because the logging vibration and shock environment is much more benign than that during drilling.

In a logging operation, the pressure vessel sonde with dual gimbaled navigation system inside is let down the borehole on a wire line. The wire line can bring electric power down the hole and allow high rate two-way communications. As the borehole goes horizontal, there are techniques known to those skilled in the art to keep the sonde advancing towards the bottom of the borehole.

There is an initial four position gyrocompass to determine the initial attitude and calibrate gyro and accelerometer biases and gyro scale factors at the surveyed starting point. An external update regarding the distance traveled may be provided to the navigation system during inertial navigation.

The magnetometer data may also be a source of external update for the navigation system during inertial navigation. The outer gimbal may be carouseled ±360° and the inner gimbal may be indexed ±180° to obtain the advantages of averaging out the effect of gyro bias errors and accelerometer bias errors, and of unwinding the effect of gyro scale factor errors from the carouseling and indexing motions.

A gyrocompass is performed at stopping points during the descent and when the bottom is reached to determine attitude and calibrate sensor parameters, with a Kalman filter update to the navigation solution with the new information.

The inertial navigation can also be done as the logging sonde is withdrawn from the borehole. When the borehole's starting surveyed point is reached, the location information and a gyrocompass done at that point can be used to adjust the navigation solution back down the borehole, which is known as Kalman smoothing.

It should be apparent to those skilled in the art that the navigation systems described herein may not only be used within a borehole environment, but can be used in any environment, such as, for example, an environment that requires a navigation system having a small size and long term performance requirements with only short term requirements on the inertial sensors. One such environment may be robotics or personal navigation.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

Other embodiments will occur to those skilled in the art and are within the following claims.

What is claimed is:

1. An omnidirectional borehole navigation system comprising:

a housing for traversing a borehole;

a gimbal system including at least one outer gimbal connected to said housing and at least one inner gimbal nested in and connected to said outer gimbal;

a solid state three-axis gyro assembly mounted on said at least one inner gimbal;

a solid state three-axis accelerometer assembly mounted on said inner gimbal;

gyro logic circuits on said at least one inner gimbal responsive to said three-axis gyro assembly to produce the inertial angular rate about each gyro input axis;

accelerometer logic circuits on said at least one inner gimbal to produce the non-gravitational acceleration along each accelerometer input axis; and a microprocessor responsive to said gyro logic circuits and said accelerometer logic circuits for determining the attitude and the position of said housing in its borehole.

2. The omnidirectional borehole navigation system of claim 1 in which said housing includes a pressure vessel.

3. The omnidirectional borehole navigation system of claim 1 in which said housing includes a Dewar vacuum jacket.

4. The omnidirectional borehole navigation system of claim 1 in which said housing includes a standoff structure for spaceably interconnecting said housing with a borehole drill pipe.

5. The omnidirectional borehole navigation system of claim 4 in which the space between said housing and said drill pipe forms a drilling mud flow channel.

6. The omnidirectional borehole navigation system of claim 1 in which said outer gimbal axis extends longitudinally along said housing.

7. The omnidirectional borehole navigation system of claim 1 in which said inner gimbal axis extends laterally to said housing.

8. The omnidirectional borehole navigation system of claim 1 in which said outer gimbal includes a drive motor for rotating said outer gimbal with complete rotary freedom.

9. The omnidirectional borehole navigation system of claim 1 in which said at least one inner gimbal includes a drive motor for rotating said inner gimbal.

10. The omnidirectional borehole navigation system of claim 1 in which said at least one inner gimbal is rotatable 180° in each direction.

11. The omnidirectional borehole navigation system of claim 1 in which said at least one inner gimbal includes a twist capsule device and said outer gimbal includes a slip ring device for electrically interconnecting said gyro and accelerometer logic circuits with said microprocessor.

12. The omnidirectional borehole navigation system of claim 1 in which at least one of the gimbals is equipped with gimbal angle readouts.

13. The omnidirectional borehole navigation system of claim 1 in which said solid state three-axis gyro system includes three, one-axis gyros.

14. The omnidirectional borehole navigation system of claim 1 in which said solid state three-axis gyro system includes a MEMS gyro system.

15. The omnidirectional borehole navigation system of claim 1 in which said solid state three-axis gyro system includes a laser gyro system.

16. The omnidirectional borehole navigation system of claim 1 in which said solid state three-axis gyro system includes a quartz gyro system.

17. The omnidirectional borehole navigation system of claim 1 in which said solid state three-axis accelerometer system includes three, one-axis accelerometers.

18. The omnidirectional borehole navigation system of claim 1 in which said solid state three-axis accelerometer system includes a MEMS accelerometer system.

19. The omnidirectional borehole navigation system of claim 1 in which said solid state three-axis accelerometer system includes a quartz accelerometer system.

20. The omnidirectional borehole navigation system of claim 1 in which said gyro logic circuits include a field programmable gate array.

21. The omnidirectional borehole navigation system of claim 1 in which said gyro logic circuits include an application-specific integrated circuit.

22. The omnidirectional borehole navigation system of claim 1 in which said accelerometer logic circuits include a field programmable gate array.

23. The omnidirectional borehole navigation system of claim 1 in which said accelerometer logic circuits include an application-specific integrated circuit.

24. The omnidirectional borehole navigation system of claim 1 in which said at least one inner gimbal includes a plurality of stacked gimbal elements, one corresponding to each gyro axis and accelerometer axis.

25. The omnidirectional borehole navigation system of claim 1 in which said microprocessor commands carouseling and indexing of said gimbals to average out the effect of gyro and accelerometer system bias errors.

26. The omnidirectional borehole navigation system of claim 1 in which said microprocessor commands rotation of said gimbals to determine north and vertical directions and to calibrate the gyro and accelerometer biases, to effect gyrocompassing, and to calibrate gyro scale factors.

27. The omnidirectional borehole navigation system of claim 1 in which said microprocessor also determines the velocity of said housing in its borehole.

28. An omnidirectional borehole navigation system comprising:

a housing for traversing a borehole;

a dual gimbal system including an outer gimbal connected to said housing and an inner gimbal nested in and connected to said outer gimbal;

a MEMS three-axis gyro assembly mounted on said inner gimbal;

a MEMS three-axis accelerometer assembly mounted on said inner gimbal;

gyro logic circuits on said inner gimbal responsive to said three-axis gyro assembly to produce the inertial angular rate about each gyro input axis;

accelerometer logic circuits on said inner gimbal to produce the non-gravitational acceleration along each accelerometer input axis; and a microprocessor responsive to said gyro logic circuits and said accelerometer logic circuits for determining the attitude, the position, and the velocity of said housing in its borehole.

29. The omnidirectional borehole navigation system of claim 28 in which said outer gimbal axis extends longitudinally along said housing.

30. The omnidirectional borehole navigation system of claim 28 in which said inner gimbal axis extends laterally to said housing.

31. The omnidirectional borehole navigation system of claim 28 in which said gyro logic circuits include a field programmable gate array.

32. The omnidirectional borehole navigation system of claim 28 in which said gyro logic circuits include an application-specific integrated circuit.

33. The omnidirectional borehole navigation system of claim 28 in which said accelerometer logic circuits include an application-specific integrated circuit.

34. The omnidirectional borehole navigation system of claim 28 in which said accelerometer logic circuits include a field programmable gate array.

35. An omnidirectional borehole navigation system comprising:
- a housing for traversing a borehole;
- a gimbal system including an outer gimbal connected to said housing and an inner gimbal nested in and connected to said outer gimbal, said inner gimbal including a plurality of stacked inner gimbal elements;
- a MEMS three-axis gyro assembly, each axis of said gyro assembly mounted on one of said stacked inner gimbal elements;
- a MEMS three-axis accelerometer assembly mounted on said inner gimbal, each axis of said accelerometer assembly mounted on one of said stacked inner gimbal elements;
- gyro logic circuits on said inner gimbal responsive to said three-axis gyro assembly to produce the inertial angular rate about each gyro input axis;
- accelerometer logic circuits on said inner gimbal to produce the non-gravitational acceleration along each accelerometer input axis; and
- a microprocessor responsive to said gyro logic circuits and said accelerometer logic circuits for determining the attitude, the position, and the velocity of said housing in its borehole.

36. The omnidirectional borehole navigation system of claim 35 in which each of said stacked inner gimbals includes a drive motor for rotating the corresponding inner gimbal element.

37. The omnidirectional borehole navigation system of claim 35 in which said stacked inner gimbals include a drive motor for rotating each of said stacked inner gimbal elements.

38. An omnidirectional borehole navigation system comprising:
- a housing for traversing a borehole;
- a gimbal system including at least one outer gimbal connected to said housing and an inner gimbal nested in and connected to said outer gimbal;
- a solid state three-axis gyro assembly mounted within said housing;
- a solid state three-axis accelerometer assembly mounted within said housing;
- gyro logic circuits mounted within said housing and responsive to said three-axis gyro assembly to produce the inertial angular rate about each gyro input axis;
- accelerometer logic circuits mounted within said housing and responsive to said three-axis accelerometer assembly to produce the non-gravitational acceleration along each accelerometer input axis; and
- a microprocessor responsive to said gyro logic circuits and said accelerometer logic circuits for determining the attitude, the position, and the velocity of said housing in its borehole.

39. The omnidirectional borehole navigation system of claim 38 in which said three-axis gyro assembly and said three-axis accelerometer assembly are mounted on said inner gimbal.

40. A method for borehole navigation, comprising the steps of:
- providing a housing for traversing a borehole, the housing including a gimbal system having at least one outer gimbal connected to said housing and an inner gimbal nested in and connected to said outer gimbal, said gimbal system including a solid state three-axis gyro assembly and a solid state three-axis accelerometer assembly mounted within said gimbal system;
- obtaining information about a position of a first point in the borehole;
- determining the attitude of the first point in the borehole using said three-axis gyro assembly and said three-axis accelerometer assembly by rotating said gimbal system through four or more gyrocompass positions to determine gyro and accelerometer biases, and the Earth's rotation and gravity vectors;
- traversing through the borehole to a second point in the borehole;
- determining the attitude at the second point in the borehole using said three-axis gyro assembly and said three-axis accelerometer assembly; and
- determining the position of the second point in the borehole based upon information about the attitude at the first and second points in the borehole and the distance traversed from the first position to the second position in the borehole.

41. The method for borehole navigation of claim 40, further including the step of calibrating the gyro scale factors from the slews between gyrocompass positions.

42. A method for borehole navigation, comprising the steps of:
- providing a housing for traversing a borehole, the housing including a gimbal system having at least one outer gimbal connected to said housing and an inner gimbal nested in and connected to said outer gimbal, said gimbal system including a solid state three-axis gyro assembly and a solid state three-axis accelerometer assembly mounted within said gimbal system;
- obtaining information about a position of a first point in the borehole;
- determining the attitude of the first point in the borehole using said three-axis gyro assembly and said three-axis accelerometer assembly by rotating said gimbal system through four or more gyrocompass positions to determine gyro and accelerometer biases, and the Earth's rotation and gravity vectors;
- while traversing through the borehole and carouseling and/or indexing the gimbals, determining the attitude using outputs of said three-axis gyro assembly and propagating the position using the increment of drill pipe advance times the attitude; and
- Kalman filter updating the position of a second point in the borehole based upon the propagated position from the first point, information about the attitude from a gyrocompass at the second point, and the distance traversed from the first point to the second point in the borehole.

43. The method for borehole navigation of claim 42, further including the step of calibrating the gyro-scale factors from the slews between gyrocompass positions.

44. A method for borehole navigation comprising the steps of:
- providing a housing for traversing a borehole, the housing including a gimbal system having at least one outer gimbal connected to said housing and an inner gimbal nested in and connected to said outer gimbal, said gimbal system including a solid state three-axis gyro assembly and a solid state three-axis accelerometer assembly mounted within said gimbal system;
- determining the attitude at the first point in the borehole using said three-axis gyro assembly and three-axis accelerometer assembly by rotating said gimbal system through four or more gyrocompass positions to determine gyro and accelerometer biases, and the Earth's rotation and gravity vectors;

while traversing through the borehole and carouseling and/or indexing the gimbals, determining the attitude, position, and velocity by inertial navigation algorithms using the outputs of said three-axis gyro assembly and said three-axis accelerometer assembly to obtain an inertial navigation solution, and Kalman filter updating the inertial navigation solution using the increment of a drill pipe advance external aid; and Kalman filter updating the position of a second point in the borehole based upon the inertial navigation result for the second point, information about attitude from a gyrocompass at the second point, and the distance traveled from the first point to the second point in the borehole.

45. The method for borehole navigation of claim 44, further including the step of calibrating the gyro scale factors from the slews between gyrocompass positions.

* * * * *